US009096161B2

(12) United States Patent
Huber

(10) Patent No.: US 9,096,161 B2
(45) Date of Patent: Aug. 4, 2015

(54) VEHICLE DRIVER ASSISTANT WITH AN ELECTRONIC CONTROL DEVICE FOR CHECKING THE CLEARANCE POSSIBILITY FOR A VEHICLE

(71) Applicant: Bayerische Motoren Werke Aktiengesellschaft, Munich (DE)

(72) Inventor: Andreas Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 13/660,393

(22) Filed: Oct. 25, 2012

(65) Prior Publication Data

US 2013/0110346 A1     May 2, 2013

(30) Foreign Application Priority Data

Oct. 27, 2011   (DE) .......................... 10 2011 085 311

(51) Int. Cl.
| | | |
|---|---|---|
| *G01B 11/00* | (2006.01) | |
| *G06F 11/30* | (2006.01) | |
| *G01M 17/007* | (2006.01) | |
| *B60Q 9/00* | (2006.01) | |
| *B60T 7/22* | (2006.01) | |
| *B60R 19/54* | (2006.01) | |
| *B60T 7/12* | (2006.01) | |

(52) U.S. Cl.
CPC ... *B60Q 9/00* (2013.01); *B60T 7/22* (2013.01); *B60R 19/54* (2013.01); *B60T 7/12* (2013.01)

(58) Field of Classification Search
CPC ............ B60Q 9/00; B60R 19/54; B60T 7/54; B60T 7/22
See application file for complete search history.

(56) References Cited

U.S. PATENT DOCUMENTS 4,500,977 A     2/1985  Gelhard
8,354,920 B2 *  1/2013  Kole ............................ 340/435

FOREIGN PATENT DOCUMENTS

| DE | 30 36 081 A1 | 4/1982 |
| DE | 10 2004 003 294 A1 | 8/2005 |
| DE | 10 2004 003 294 B4 | 12/2006 |
| DE | 10 2009 028 644 A1 | 2/2011 |

OTHER PUBLICATIONS

Android boy, Smart Measure Lite (ver 1.5) manual, Oct. 6, 2010.*
John Pickle, Measuring Length and Area of Objects in Digital Images Using AnalyzingDigitalImages Software, Mar. 19, 2008.*
German Search Report dated Jun. 11, 2012 including partial English-language translation (Ten (10) pages).

* cited by examiner

*Primary Examiner* — John Q Nguyen
*Assistant Examiner* — Alan D Hutchinson
(74) *Attorney, Agent, or Firm* — Crowell & Moring LLP

(57) ABSTRACT

A vehicle driver assistant with an electronic control device checks the clearance possibility for a vehicle below an upper obstruction as a function of the overall vehicle height, in particular in the case of a roof load. The electronic control device can be connected to an input unit, which is preferably independent of the motor vehicle. This input unit allows at least one overall vehicle height to be entered manually, in particular, for the roof load.

16 Claims, 3 Drawing Sheets

VEHICLE DRIVER ASSISTANT WITH AN ELECTRONIC CONTROL DEVICE FOR CHECKING THE CLEARANCE POSSIBILITY FOR A VEHICLE

CROSS REFERENCE TO RELATED APPLICATION

This application claims priority under 35 U.S.C. §119 from German Patent Application No. 10 2011 085 311.1, filed Oct. 27, 2011, the entire disclosure of which is herein expressly incorporated by reference.

BACKGROUND AND SUMMARY OF THE INVENTION

The invention relates to a vehicle driver assistant with an electronic control device for checking the clearance possibility for a vehicle.

A vehicle driver assistant with an electronic control device for checking the clearance possibility for a vehicle is known, for example, from the prior art DE 10 2004 003 294 B4. In this case there is a micro switch that, in the actuated state, reports the mounting of a roof rack. Then the absolute overall vehicle height is automatically selected from a data memory and could deviate from the actual overall vehicle height.

The object of the present invention is to improve a vehicle driver assistant for checking the clearance possibility for a vehicle with respect to the accuracy of the overall vehicle height determination and an enhanced ease of use.

In accordance with the present invention, there is provided a vehicle driver assistant with an electronic control device for checking the clearance possibility for a vehicle below an upper obstruction (such as a bridge, tunnel, parking garage, etc.) as a function of the overall vehicle height, in particular in the case of a roof load and/or a load extending beyond the roof. The electronic control device can be connected to an input unit. This input unit allows at least one actual overall vehicle height to be entered manually, in particular, into the control device for a roof load and/or for a load extending beyond the roof (such as a vehicle with bicycles, a vehicle with an empty roof rack, a vehicle with a ski box, etc.).

In this context, the overall vehicle height can be entered directly or indirectly into the control device by use of the input unit. That is, the input unit can transmit to the control device either the overall vehicle height itself or the data required to determine the overall vehicle height, after the necessary data have been manually entered into the input unit.

The input unit is preferably a mobile terminal device (such as a smartphone) with photo function, wherein the necessary data for determining the overall vehicle height are generated by way of a suitable photo of the loaded vehicle. For example, if the height of the unloaded vehicle is known and a suitable image processing algorithm is used, it is possible to calculate the overall vehicle height from the photo, after the ratio between the vehicle height of the unloaded vehicle and that portion of the load that extends beyond the roof has been evaluated. The algorithm in turn can be present in the input unit itself (preferred alternative) or also in the control device.

A load that extends beyond the roof (and/or beyond the simple vehicle height without a load) is, for example, a load that is mounted on the roof, but also a rack that is mounted on the rear or on the trailer hitch and that has cargo (such as bicycles or surf boards) that protrudes beyond the roof.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
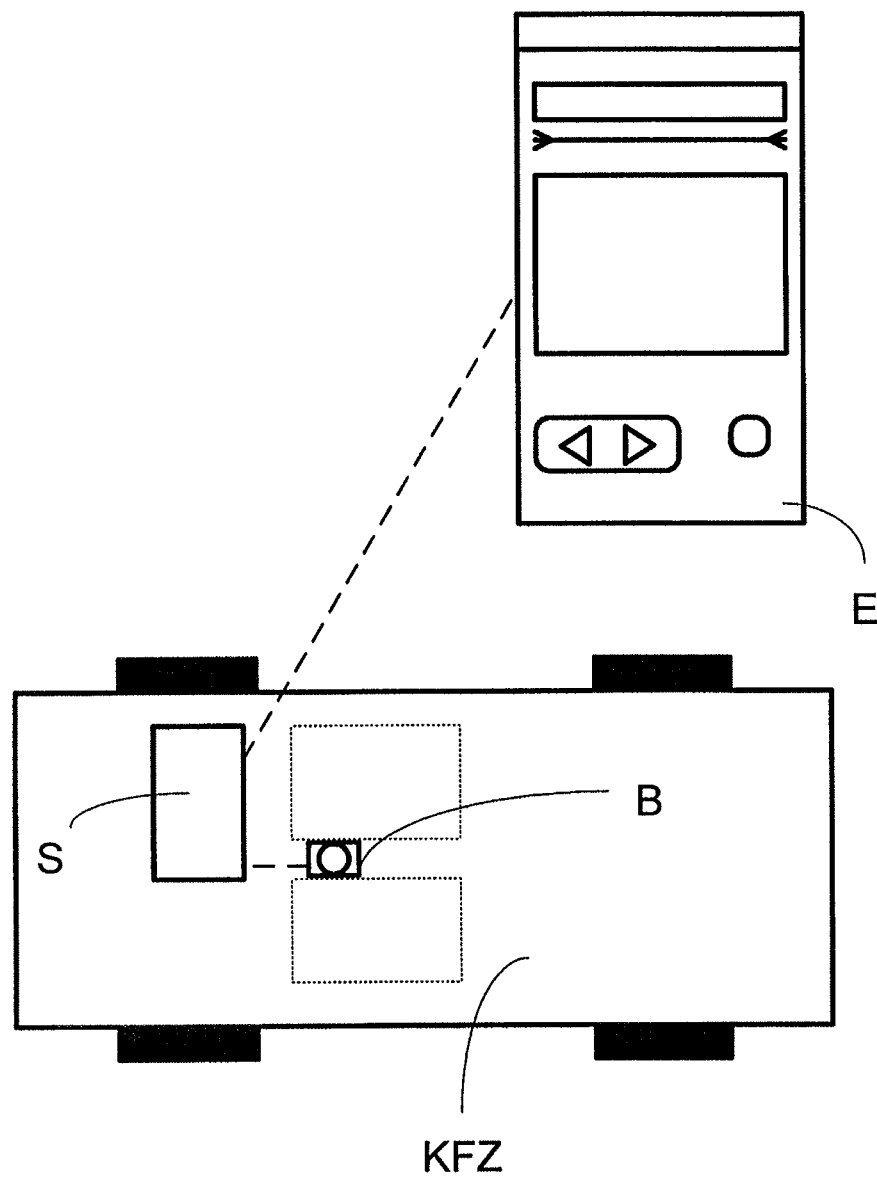
FIG. 1 is a schematic representation of the main components of a vehicle driver assistant according to an embodiment of the invention.

FIG. 1 is a schematic drawing of a vehicle KFZ having an electronic control device S for checking the clearance height possibility for a vehicle below an upper obstruction. The control device S can include, in particular, a display, on which, for example, in the simplest scenario at least the overall vehicle height having been currently entered is displayed and on which, for example, a warning signal can be emitted, if desired. Furthermore, the display can show a list of all of the entered overall vehicle heights for selection. The control device S is connected to an operator control unit B, by means of which the driver can actuate, for example, the driver assistant or by means of which an overall vehicle height can be selected from the list. The control device S can be connected, for example, to an input unit E by way of a cable-connected (for example, USB interface) or a cordless connection (Bluetooth™, WLAN, NFC, ... ).

Figure 2:
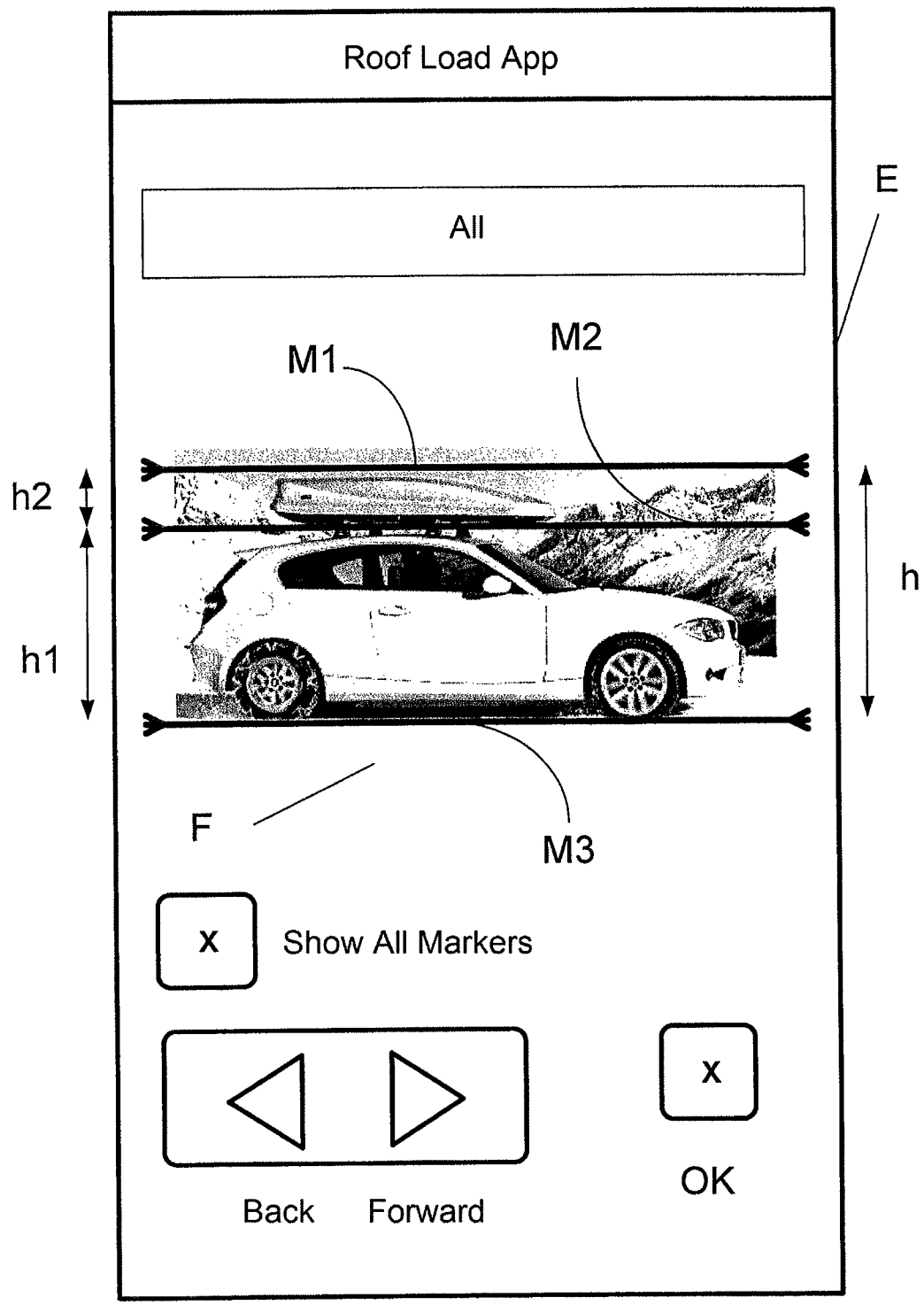
FIG. 2 shows an input option by use of a photo using a mobile terminal device in the case of a vehicle with a load on the roof.
Figure 3B:
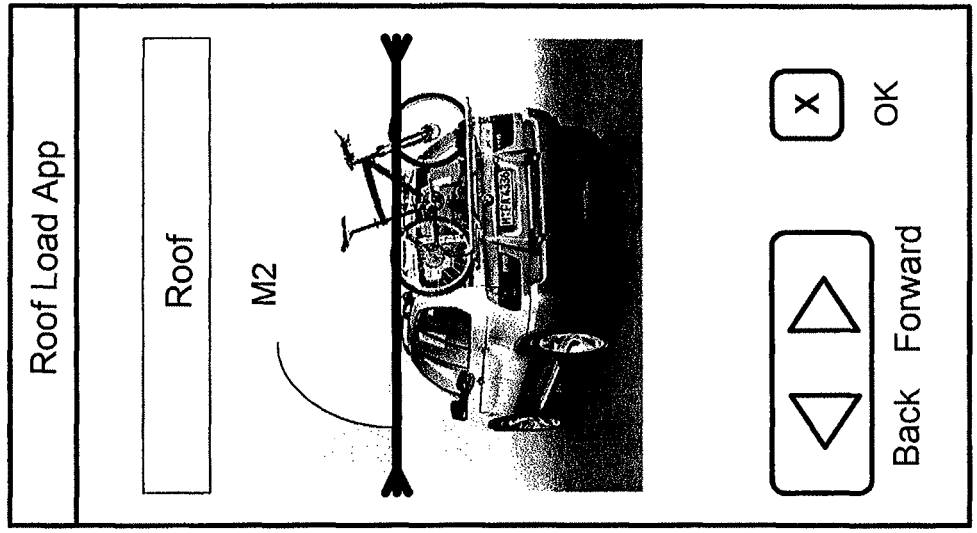
FIGS. 3a and 3b show, in each instance, an input option by use of a photo using a mobile terminal device in the case of a vehicle with a rear rack and bicycles protruding beyond the roof.
Figure 3A:
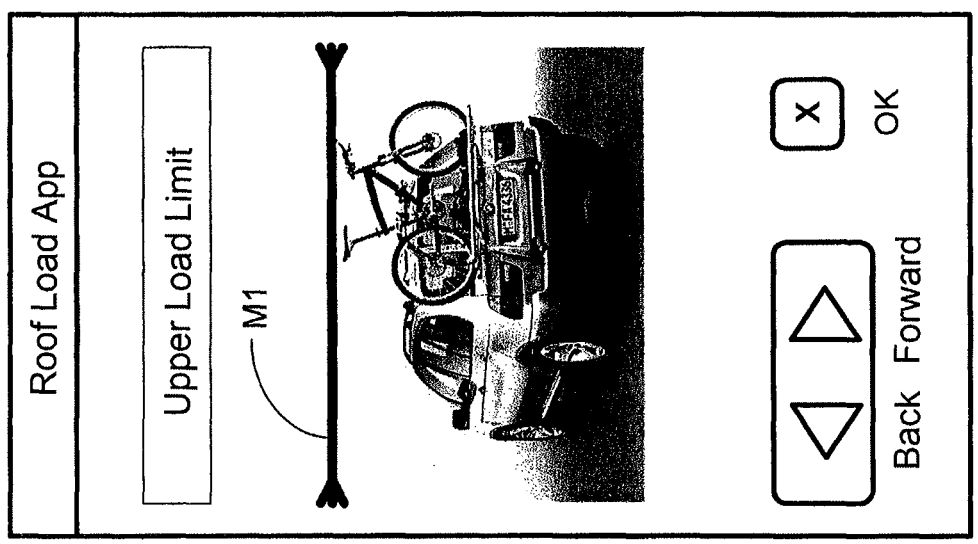

FIGS. 2, 3a and 3b show, in each case, an input unit E in the form of a mobile terminal device (for example, iPhone™ or other smartphone) with an operating mode according to an embodiment of the invention.

In a preferred embodiment, the overall vehicle height h is determined, which includes more specifically being entered, preferably by using a photo F of the vehicle with the respective load. The photo can be taken and/or entered by the vehicle user himself with the mobile terminal device E.

When determining the overall vehicle height h, the vehicle height h1 without the roof load has already been stored preferably beforehand in a data memory of the input unit E or the control device S. For this purpose, the data memory of the control device S can already be programmed with this data item by the manufacturer. Otherwise, the vehicle height h1 can also be entered into the control device S manually by the vehicle user with the operator control unit B or with the input unit E (not explained in detail at this point).

The overall vehicle height h can be determined preferably indirectly by entering the ratio of the vehicle height h1 without a roof load to the height h2 of the roof load (FIG. 2) or that portion of the load that protrudes beyond the roof (FIG. 3). In this case it is assumed that the vehicle height h1 is known.

FIG. 2 shows how the vehicle height h1 without the roof load and the height h2 of that portion of the load that protrudes beyond the roof can be entered though the input of three markers M1, M2, M3, in order to identify the vehicle contact surface (for example, road, garage floor), in order to identify the roof (upper roof limit) and in order to identify the upper limit of the roof load. In this case, the markers are shown in the form of bars, which can be slid with a finger directly over the photo F preferably on a touch screen ("sliding bar"). Moreover, several markers are contemplated in order to determine the overall vehicle height h with a higher degree of precision. For example, the wheel diameter may vary, as a function of the mounted rim and tire, for the same vehicle model, especially with respect to classes of larger vehicles (for example, SUVs, pickups, trucks, etc.). In this case, the sliding bar can be used, for example, to distinguish an offset that ought to be added to the overall vehicle height owing to the increase in the wheel diameter. In order to determine the limits using the sliding bar, an automatic detection of the most important edges by use of image recognition algorithms may also be performed. For example, if image recognition algorithms are present, it is possible to provide only one marker—for example, the sliding bar M2 for identifying the transition from the roof to the roof load, in order to support the evaluation of the image recognition with respect to accuracy and ease.

The image recognition algorithm can also carry out pattern matching with a stored standard image for the vehicle. And, in the case that the camera direction is not parallel to the ground and, therefore, the roof load is stretched in the vertical direction relative to the vehicle or appears to be compressed, the image recognition algorithm can perform a correction of the proportions extracted from the camera image or, as an alternative, discard the picture and invite the user to take another picture of the vehicle.

Assuming that the height h1 is known (as explained above), it is possible to calculate the overall vehicle height h from the ratio of the height h1 to the height h2 that is entered, for example, by using the markers M1, M2, M3 in FIG. 2, and then the overall vehicle height can be saved.

The mobile input unit (E) with the illustrated functional possibility can be implemented via a software module that is programmed for this purpose (for example, a so-called "app"), which is novel independently of the vehicle KFZ.

The invention offers the advantage of a very user friendly and simple input of the overall vehicle height. In the simplest scenario the vehicle driver assistant allows the driver to check the clearance height possibility, for example, when driving into a tunnel or into a parking garage, by just displaying the overall vehicle height. However, the vehicle driver assistant can also perform an automatic matching of the maximum allowable height with the entered overall vehicle height h, for example, by using the stored data of a navigation system or by way of camera-based data and, if desired, can send an acoustic, optical and/or haptic warning signal to the driver. An automatic brake intervention could also be carried out.

The invention is intended for use in an analogous manner when the vehicle is provided with a load that extends laterally beyond the vehicle width, and the clearance possibility is to be checked not only with respect to the height, but also the width. Similarly, it can also be used to check a length or any other useful dimension of the vehicle.

In addition, it is also possible to automatically detect a certain load (load profile), for which an overall vehicle height has already been determined, and to adjust the driver assistant system to the new height that has already been saved. The automatic detection is based on an evaluation of the driving dynamics data (longitudinal and transverse dynamics) and road resistances, which are collected in an activated load profile and are placed opposite the data of the unloaded vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle driver assistant for a vehicle, comprising:
   an electronic control device operatively configured to check a clearance possibility for the vehicle below an upper obstruction as a function of an overall vehicle height, wherein
   the electronic control device is operatively coupleable with an input unit, and
   wherein the input unit is configured to receive an actual overall vehicle height that includes a load on the vehicle extending vertically beyond a roof of the vehicle, the actual overall vehicle height being received as a photo input of the vehicle on the load, wherein a known vehicle height of the vehicle without the load is previously stored in a data memory of the electronic control device or the input unit, wherein the electronic control device is configured to determine said actual overall vehicle height with the load as a function of the stored vehicle height without the load.

2. The vehicle driver assistant according to claim 1, wherein the input unit coupleable with the electronic control device is a mobile terminal device.

3. The vehicle driver assistant according to claim 1, wherein the actual overall vehicle height is determinable based on a ratio of the stored vehicle height without the load to a height portion of the load that extends vertically beyond the roof.

4. The vehicle driver assistant according to claim 3, wherein the ratio of the vehicle height without the load to the height portion of the load extending vertically beyond the roof is enterable via a user input of at least one slidable marker that is positionable to identify the roof in the photo of the vehicle with the load.

5. The vehicle driver assistant according to claim 4, wherein three markers are provided, one marker identifying a vehicle contact surface, another marker identifying the roof, and a third marker identifying an upper limit of the roof load.

6. The vehicle driver assistant according to claim 1, wherein the overall vehicle height with the load extending vertically beyond the roof is stored in at least one of the electronic control device and the input unit for selective future use.

7. An input unit operable in conjunction with a vehicle driver assistant having an electronic control device for checking a clearance possibility of the vehicle, the input unit comprising:
   a mobile terminal having a software application configured to determine an actual overall vehicle height of the vehicle having a load on the vehicle extending vertically beyond a roof of the vehicle, wherein the actual overall vehicle height is determined by the mobile terminal from a photo input of the vehicle and the load, and wherein a known vehicle height of the vehicle without the load is previously stored in a data memory of the electronic control device or the input unit, wherein the electronic control device is configured to determine said actual overall vehicle height with the load as a function of the stored vehicle height without the load.

8. The input unit according to claim 7, wherein the actual overall vehicle height is determinable based on a ratio of the stored vehicle height without the load to a height portion of the load that extends vertically beyond the roof.

9. The input unit according to claim 8, wherein the ratio of the vehicle height without the load to the height portion of the load extending vertically beyond the roof is enterable via a user input of at least one slidable marker that is positionable to identify the roof in the photo of the vehicle with the load.

10. A method for obtaining an actual overall vehicle height of a vehicle having a load extending vertically beyond a roof of the vehicle, the method comprising the acts of:
    storing the vehicle height without the load in a data memory of at least one of an input unit and an electronic control device of a vehicle driver assistant of the vehicle; and
    receiving, in the electronic control device from an external source, a photo input of the vehicle;
    determining the actual overall vehicle height with the load on the vehicle extending vertically beyond the roof based on the stored vehicle height without the load and the photo input.

11. The method according to claim 10, further comprising determining the actual overall vehicle height based on a ratio of the stored vehicle height without the load to a height portion of the load that extends vertically beyond the roof.

12. The method according to claim 11, wherein the ratio of the vehicle height without the load to the height portion of the load extending vertically beyond the roof is enterable via a user input of at least one slidable marker that is positionable to identify the roof in the photo of the vehicle with the load.

13. A computer product, comprising:
    a non-transitory computer readable medium having stored thereon program code segments that:
        obtain photographic data of a vehicle having a load extending vertically beyond a roof of the vehicle;
        store a known vehicle height without the load extending vertically beyond the roof of the vehicle;
        transmit data by which an actual overall vehicle height of a vehicle with the load extending vertically beyond the roof and determine the actual overall vehicle height of the vehicle with the load extending vertically beyond the roof as a function of the photographic data and the stored vehicle height without the load.

14. The computer product according to claim 13, wherein the computer product is a smartphone having a display, the display displaying the photograph of the vehicle with the load, and the program code segments further recognizing at least one marker applied to the photograph on the display, the at least one marker being indicative of at least the roof in the photograph of the vehicle with the load.

15. The computer product according to claim 13, wherein the actual overall vehicle height is determinable based on a ratio of the stored vehicle height without the load to a height portion of the load that extends vertically beyond the roof.

16. The computer product according to claim 15, wherein the ratio of the vehicle height without the load to the height portion of the load extending vertically beyond the roof is enterable via a user input of at least one slidable marker that is positionable to identify the roof in the photo of the vehicle with the load.

* * * * *